Figure 1:
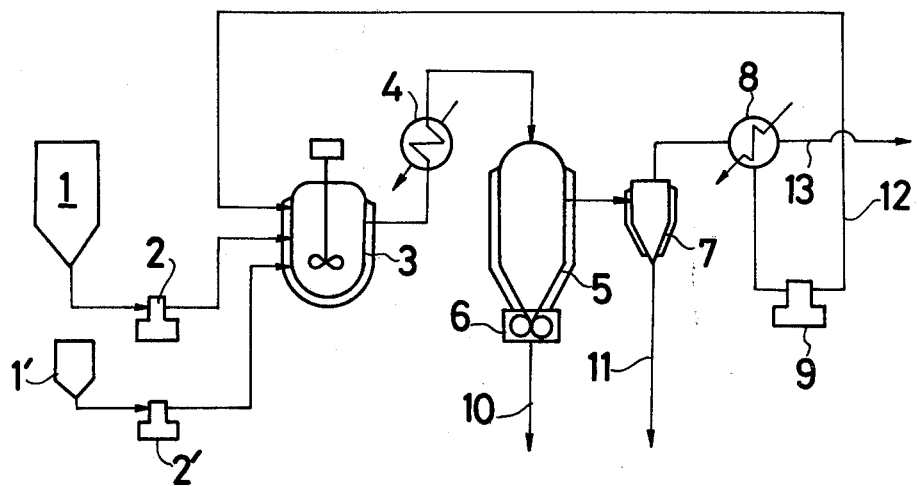

United States Patent [19]

Nakagawa et al.

[11] 4,068,061
[45] Jan. 10, 1978

[54] PROCESS FOR THE CONTINUOUS PREPARATION OF REACTIVE COPOLYMERS

[75] Inventors: Toshimi Nakagawa; Takanobu Numata, both of Kamakura; Noribumi Ito, Yokohama, all of Japan

[73] Assignee: Mitsui Toatsu Chemicals Inc., Tokyo, Japan

[21] Appl. No.: 667,413

[22] Filed: Mar. 16, 1976

[30] Foreign Application Priority Data

Mar. 20, 1975 Japan .................................. 50-33011

[51] Int. Cl.² .......................................... C08F 220/32
[52] U.S. Cl. .................................... 526/68; 428/461; 526/224; 526/273
[58] Field of Search .................................. 526/68, 273

[56] References Cited

U.S. PATENT DOCUMENTS

| | | | |
|---|---|---|---|
| 3,932,367 | 1/1976 | Labana et al. | 526/273 |
| 3,968,059 | 7/1976 | Shimada et al. | 526/68 |

Primary Examiner—Harry Wong, Jr.

[57] ABSTRACT

A process is disclosed for the preparation of reactive copolymers by bulk- or solution polymerizing a material composed of a monomeric mixture consisting of at least one glycidyl group-containing monomer and at least one monomer copolymerizable therewith and a chain transfer agent in a stirred-tank reactor, and withdrawing from the reactor a liquid which contains the reactive copolymer in an amount equal to the feed. The process is improved by removing from the reaction liquid together with the reactive copolymer the adduct formed in the liquid by the reaction of the chain transfer agent with the monomers. The residue is then liquefied and directly recycled to the reactor.

1 Claim, 1 Drawing Figure

PROCESS FOR THE CONTINUOUS PREPARATION OF REACTIVE COPOLYMERS

DETAILED EXPLANATION OF THE INVENTION

This invention relates to a process for the continuous preparation of reactive copolymers and more particularly, to a process for making in a stirred-tank reactor, by continuous bulk or solution polymerization, reactive copolymers suited to be used particularly as thermosetting powder paint (hereinafter referred to as the reactive copolymers) from at least one monomer containing a functional group of the general formula

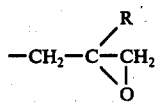

(wherein R stands for hydrogen or a methyl group), i.e., at least one glycidyl group-containing monomer such as glycidyl acrylate, glycidyl methacrylate, β-methylglycidyl acrylate, β-methylglycidyl methacrylate and allylglycidyl ether (hereinafter referred to as the glycidyl group-containing monomer) and at least one monomer copolymerizable therewith.

Processes for making the reactive copolymers, can be classified into two groups: the suspension or emulsion polymerization performed by water-dispersing the monomers to be copolymerized and the solution or bulk polymerization performed in the optional presence of a solvent.

As it is well known, the former group of processes employs auxiliary chemicals such as a dispersing agent or an emulsifying agent, which not only increases the specific cost but also calls for complex treatment of the drainage, i.e., the water containing such auxiliary chemicals dissolved or suspended therein. This drainage remains in the polymerization system after the recovery of the object copolymer, since the drainage has a high COD (Chemical Oxygen Demand) value and causes environmental pollution if discarded untreated. Thus additional apparatus for treating the drainage and reducing the latter's COD value to a predetermined level before discarding are required. In contrast thereto, the latter group of processes is far more advantageous for industrial scale practice, in that there is no dispersing or emulsifying agent, not even water, and consequently no drainage-treating apparatus is needed.

It is also known that while the copolymers formed by batch polymerization methods have broad distribution in composition and molecular weight, those obtained by continous polymerization methods using a stirred-tank reactor have homogeneous composition and narrow molecular weight distribution. Heretofore, it has been believed that to effect the bulk or solution polymerization continuously on an industrial scale, the following method was generally advantageous; the method for making the copolymers consisted of providing two openings in the stirred-tank reactor and simultaneously continuously feeding the polymerization material through one of the openings, while withdrawing from the other opening the reaction liquid containing the formed copolymer, in an amount corresponding to that of the fed material. The polymerization was performed always under constant conditions, and the product copolymer had relatively homogeneous composition and a narrow molecular weight distribution. Furthermore, because the content of the reactor was thoroughly stirred, the reaction could be performed at substantially uniform temperature and therefore qualitative heterogeneity caused by localized heating could be effectively avoided. An additional advantage was that normally the rate of polymerization could be increased with no deterimental result.

The continuous polymerization reaction using the stirred tank reactor while it is excellent for making the copolymers as above-described, it is nevertheless subject to such drawbacks as herein below described.

That is, although the mixture of unreacted monomers can be recovered, its re-use is extremely cumbersome. In the continuous preparation of the copolymers by the bulk or solution polymerization using a stirred-tank reactor, normally the final rate of conversion ranges from 50 to 80 %, at most around 90 %. Therefore the unreacted monomers and the solvent, if used, which are contained in the liquid resulting from the reaction, must be separated from the copolymer formed and also contained in the same reaction liquid, and recovered for effective re-use. For making a copolymer of particularly homogeneous composition continuously, however, an extremely complicated sequence of procedural steps must be employed for the re-use, such as a continuous analysis of the recovered liquid mixture containing the unreacted monomers, solvent and chain transfer agent, a determination of its composition and comparison of the result with the composition of the liquid feed continuously supplied to the stirred-tank reactor, a determination of the amounts of the respective components in the liquid feed, the addition of the required component or components of each measured amount, a thorough agitation for producing proper homogeneity, and a subsequent analysis of the polymerization material to reconfirm the composition thereof before its feeding into the reactor. Furthermore, in the preparation of the aforesaid reactive copolymer suited as thermosetting powder paint, normally at least three different monomers are used in the copolymerization, and the monomers and solvent have in some cases closely resembling physical properties. Thus the analyses of the compositions at best require immense labor and time, and in the worst case an analysis of the required precision is totally impossible.

On the other hand, Japanese Patent Publication No. 27865/64, which concerns the preparation of a copolymer of injection grade, discloses a process in which the reaction liquid withdrawn from the reactor as an effluent is evaporated so that the components other than the formed copolymer are gasified, and the gas is recycled into the reactor in which the polymerization is continuously performed, while the remaining copolymer is withdrawn from the system at an average rate substantially corresponding to the feed rate of the monomeric material into the system on a weight basis.

When we attempted, however, to apply the above process disclosed in Japanese Patent Publication No. 27865/64 to the preparation of reactive copolymer from the polymerization material composed of a monomeric mixture comprising at least one of the glycidyl group-containing monomers and at least one monomer copolymerizable therewith, and a chain transfer agent, using a stirred-tank reactor, very serious disadvantages were discovered.

Among them the reactive copolymer obtained had a strongly offensive odor (absent from the copolymer of identical composition formed by conventional suspension polymerization) and tended to agglomerate to form blocks during storage. Furthermore, the physical properties of the formed copolymer varied as the operation continued, failing to continuously produce a copolymer of constant properties. For example, the melt flow index of the copolymer kept rising with reaction time, thus rendering the continuous operation over a prolonged period impossible.

According to our studies, it was found that when the continuous polymerization of a material composed of a monomeric mixture comprising at least one glycidyl group-containing monomer and at least one monomer copolymerizable therewith is effected, and the chain transfer agent is for example a mercaptan, an adduct is formed (besides the intended reactive copolymer) which results from the addition reaction of a part of the monomeric mixture with the chain transfer agent. It was also found, quite unexpectedly, that the addition reaction still takes place at the normal temperature at which usually a polymerization reaction scarcely takes place, and also in a nitrogen gas atmosphere. Although the details of the reaction mechanism are yet unclear, it can be confirmed that a considerable amount of a substance having identical chemical composition with that of the adduct is mixed in the reactive copolymer formed by the process disclosed in Japanese Patent Publication No. 27865/64.

Generally in the preparation of reactive copolymers, chain transfer agents such as mercaptans are frequently used to control the average molecular weight of the product copolymer according to its intended utilization. When reactive copolymers, particularly the type intended by this invention, are to be formed, it is required that the product have an average molecular weight, such as preferably from 1,500 to 15,000, but smaller than that of a normal injection grade copolymer as that intended by the cited Japanese Patent Publication. Consequently, the former requires the addition of a greater amount of chain transfer agent. Hence, the occurrence of the disadvantageous side reaction such as the above-described addition reaction of a part of the monomeric mixture with the chain transfer agent is unavoidable in the copolymerization reaction using a monomeric mixture composed of at least one glycidyl group-containing monomer and at least one monomer copolymerizable therewith. According to our studies, furthermore, in the continuous preparation of the reactive copolymers intended by the invention, the adduct is gasified in the volatilization step together with unreacted monomers and solvent, and when the gaseous mixture is condensed, recovered and repeatedly re-used (1) the adduct accumulates in the copolymerization reaction system, i.e., the adduct's concentration in the system gradually increases, a part of the adduct eventually entering into the reactive copolymer formed to deteriorate the performance of the latter as a commercial product. Thus the copolymer comes to have a gradually increasing, offensive odor, and tends to agglomerate into blocks during storage; and (2) when the reactive copolymer is put to practical use as a thermosetting powder paint, the adduct mixed into the copolymer produces various detrimental effect, such as (a) the agglomeration of the paint during storage in the air when blended with known curing agent such as polyfunctional carboxylic acid compounds, and (b) decomposition of the adduct during the baking necessary for the practical use of the paint, generating a strong smell, of forming pinholes to impair the surface appearance of a coated film.

It is therefore an object of the present invention to provide a process for the continuous preparation of a reactive copolymer which has high practical value particularly when used as a thermosetting powder paint, the process being entirely free from the defects of the conventional processes above-described.

Hereinafter an embodiment of the present invention will be given by way of example.

The reaction liquid containing the unreacted materials is continuously withdrawn from a stirred-tank reactor, at a rate equal to the feed rate of the polymerization material comprising the monomeric mixture, chain transfer agent and solvent, preheated at the temperature and for a time sufficent to at least allow the evaporation of volatile matter composed chiefly of the unreacted monomers contained in the reaction liquid, but without causing the ring-opening or cross-linking reactions of the functional groups of the reactive copolymer present in the reaction liquid, and flashed into a volatilizer which is maintained at a reduced pressure and an elevated temperature by the heating medium circulated through the jacket. Thus the volatile matter is gasified, and separated from the reactive copolymer also present in the reaction liquid. The reactive copolymer is continuously withdrawn through an opening in a lower part of the volatilizer and withdrawn from the reaction system, whereas, the gaseous mixture composed chiefly of the gasified unreacted monomers is instead cooled in a partial condenser from which the adduct formed by the reaction of the monomers with the chain transfer agent is removed. The residual gas is passed through a total condenser to be condensed and liquefied. All of the condensation liquid thus collected is quantitatively recycled directly into the stirred-tank reactor by a pump installed below the total condenser.

When the process is practiced in the above-described manner, a continuous operation over a prolonged period causes no entrance of the adduct formed by the reaction of the chain transfer agent with a part of the monomeric mixture, and reactive copolymers of uniform properties can be produced at all time throughout the prolonged operation. During the continuous operation, furthermore, the cumbersome analysis of the composition as required by the conventional process is unnecessary, and the produced reactive copolymer is entirely free from such aforementioned defects as offensive odor, agglomeration during storage, and other drawbacks when used as a powder paint.

A preferred embodiment for practicing the present invention will now be described in greater details with reference to the accompanying drawing which represents a flowsheet of the process.

A monomeric mixture, the composition of which is preformulated so as to provide a reactive copolymer of the desired composition, is continuously and quantitatively fed into a stirred-tank reactor 3 from a storage tank 1 (the atmosphere of which has been substituted with an inert gas such as nitrogen), by means of a pump 2 capable of quantitative feeding. Separately, a chain transfer agent is kept in another storage tank 1' the atmosphere of which has also been substituted with an inert gas such as nitrogen, so as to prevent the addition reaction of the agent with the monomeric mixture during the storage, before they are copolymerized in the stirred-tank reactor 3. From tank 1' the agent is continuously and quantitatively supplied into the stirred-tank reactor 3, by pump 2' at a predetermined rate so as to control the average molecular weight of the reactive copolymer to be formed. The thus fed materials are allowed to polymerize in reactor 3 which is maintained at a reaction temperature of approximately 140° – 190° C. to a degree of polymerization of approximately 50 – 80% by weight. Incidentally, reactor 3 is equipped with stirring blades for thoroughly stirring and mixing its content, and is also conveniently equipped with a jacket or the like which allows the circulation of a heating medium to control the reaction temperature. A reaction liquid in an amout equalling the total amount of the polymerization material fed into the stirred-tank reactor 3 is discharged therefrom and sent to a pre-heater 4 heated by a heating medium. The reaction liquid containing the formed reactive polymer is heated in pre-heater 4 to a temperature sufficient to evaporate the volatile matter composed chiefly of the unreacted monomers also contained in the reaction liquid, but at a temperature (e.g. 180° – 220° C) and for a time (e.g. 1 min.) which will not induce ring-opening or cross-linking reactions of the functional groups of the reactive copolymer. Then the liquid is flashed into a jackted volatilizer 5 the pressure of which is reduced to a degree of vacuum of approximately 10 – 80 mmHg (absolute pressure). The volatilizer's jacket is heated to 150° – 200° C. Upon flashing, the liquid is conspicuously foamed, that is, the volatile matter is gasified and the gas is separated from the liquefied reactive copolymer. The liquid from which the volatile matter has been thus removed is continuously withdrawn through outlet conduit 10 by a discharge pump 6.

On the other hand, the volatile matter released from the liquefied reactive copolymer by evaporation is sent to a jaceketed partial condenser 7 of the type suited for the selective removal of the adduct of the monomers with chain transfer agent, such as a jacketed cyclone. In the partial condenser 7 the adduct is condensed and removed from the system through an outlet 11. The remaining gas is condensed and liquefied in a total condenser 8 which may be for example, a shell-and-tube type heat exchanger. The resulting condensate, i.e., a mixture of the unreacted monomers and the chain transfer agent, is directly recycled into reactor 3 through a recovery conduit 12, by means of a pump 9 capable of quantitative feeding such as a plunger pump.

As already mentioned, tanks 1 and 1' contain an inert gas; a very minor amount of this gas may be entrained by the polymerization material into the reaction system. The gas, however, takes no part in the reaction, and remains as a noncondensable gas in the total condenser 8, and is led into a vacuum generator (not shown) through a conduit 13, and then discharged.

The reactive copolymer continuously prepared in accordance with the invention, yields a product which, as mentioned, is substantially free from the adduct formed by the reaction of chain transfer agent with a part of the monomeric mixture, and therefore has the odor drastically reduced compared with the reactive copolymer containing the adduct and prepared by the known process as already described. Further, the product of the invention has no tendency for agglomeration during storage, exhibits substantially constant melt flow index and has substantially identical chemical composition with that of the monomeric mixture to be polymerized.

The "glycidyl group-containing monomers" to be employed in this invention refers to, as aforesaid, the monomers containing the functional group represented by the formula,

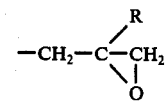

(wherein R is hydrogen or a methyl group), specific examples including glycidyl acrylate, glycidyl methacrylate, $\beta$-methylglycidyl acrylate, $\beta$-methylglycidyl methacrylate and allylglycidyl ether. Also the monomers copolymerizable with the glycidyl group-containing monomers include, for example, acrylic ester monomers such as methyl, ethyl, propyl, n-butyl, isobutyl, 2-ethylhexyl, laurayl, cyclohexyl, hydroxyethyl, hydroxypropyl, and tetrahydrofurfuryl acrylates; methacrylic ester monomers such as methyl, ethyl, propyl, n-butyl, isobutyl, 2-ethylheyxl, lauryl, cyclohexyl, hydroxyethyl, hydroxylpropyl, and tetrahydrofurfuryl methacrylates; vinyl monomers containing phenyl groups such as styrene, $\alpha$-methylstyrene and vinyl-toluene; and vinyl monomers containing nitrile groups such as acrylonitrile and methacrylonitrile. At least one of such monomers is copolymerized with the afore-said glycidyl group-containing monomer or monomers.

Examples of the chain transfer agent include aliphatic mercaptans such as methyl mercaptan, ethyl mercaptan, butyl mercaptan, octyl mercaptan, normal dodecyl mercaptan, tert.dodecyl mercaptan and mercaptoethanol; aromatic mercaptans such as benzenethiol, p-toluenethiol, m-toluenethiol, 1-naphthalenethiol and $\alpha$-toluenethiol.

When the present invention is used in a solution polymerization, useful solvents include, for example, alkylbenzenes such as benzene, toluene, ethylbenzene, xylene and cumene; ketones such as acetone, methyl ethyl ketone, methyl isobutyl ketone and isophorone; aliphatic hydrocarbons such as hexane and octane; and acetic esters such as ethyl acetate and butyl acetate.

The invention may be illustratively explained in further details by way of the following examples, referring to the apparatus shown in the drawing, all parts being by weight unless otherwise specified.

EXAMPLE 1

A monomeric mixture composed of 27.5 parts of isobutyl methacrylate, 7.5 parts of butyl acrylate, 15 parts of glycidyl acrylate and 50 parts of styrene was continuously fed into a stirred-tank reactor 3 at a rate of 5.0 liters per hour, from the raw material tank 1 in which the mixture had been stored in a nitrogen gas atmosphere. Simultaneously, tert.-dodecyl mercaptan, as the chain transfer agent, was continuously supplied into the same reactor 3 in % ratio to the monomeric mixture of 2.5 %, from a separate tank 1' in which the mercaptan had been stored in a nitrogen gas atmosphere. The stirred-tank reactor 3 was maintained at 160° C and the monomeric mixture was copolymerized with full stirring and mixing. The reaction liquid was continuously withdrawn from the reactor at a rate substantially corresponding to the feed rate of raw materials into the reactor, and heated to 210° C. in the pre-heater 4. The heated reaction liquid was then flashed into a jacketed volatilizer maintained at a vacuum of 30 mmHg (absolute pressure) and heated to 180° C., and wherein the volatile matter in the reaction liquid was gasified.

The gasified volatile matter composed mainly of the unreacted monomers was first sent to a partial condenser 7, wherein the adduct of the monomers with the chain transfer agent was entirely condensed at a rate of 50 cc per hour. The condensation product was removed from the bottom of the partial condenser 7 through the outlet 11. The remaining gaseous matter composed mainly of unreacted monomers and the chain transfer agent was led into a total condenser 8 through which a coolant was circulated, and wherein the gas (except for minor amounts of nitrogen gas entrained from the storage tanks) was condensed. The condensation product was continuously recycled into the stirred-tank reactor 3 by the pump 9, and re-used for the polymerization. The amount of the reused condensation liquid in this Example was 1.5 liters per hour.

On the other hand, the quaternary copolymer of isobutyl methacrylate-butyl acrylate-glycidyl acrylate-styrene which was separated from the gasified volatile matter in the volatilizer 5 was continuously withdrawn from the bottom of the volatilizer as a viscous liquid which was then solidified as it cooled to normal temperature, and crushed to a particle size of 20 - 200 mesh.

The copolymerization process was carried on continuously for 120 hours under the same conditions, after the copolymerization reaction reached the steady state. During the operation the copolymer formed was sampled every 12 hours. All the samples were found substantially free of offensive odors, and did not agglomerate into blocks during storage in air. Furthermore, no substantial difference in composition existed among the sampled reactive copolymers, all of them having substantially identical composition with that of the monomeric mixture supplied as raw material. Thus no substantial change in composition occurred throughout the operating period. Again the melt flow index of the sampled reactive copolymers as measured by the method specified in JIS K-6870 was constantly within the predetermined control limit of 45 - 55. Also approximately 80 % by weight of the condensed liquid collected in the partial condenser 7 was the adduct of the chain transfer agent with the monomers, and the gaseous matter flowing into the total condenser 8 was substantially free from the adduct.

Then, 72.5 parts of the crushed reactive copolymer were milled with 7.5 parts of 1,10-decanedicarboxylic acid as a curing agent and 20 parts of titanium oxide as a pigment, to provide a powder paint composition. The paint was used as an electrostatic coating of a steel plate pretreated with zinc phosphate and baked at 200° C. The coating formed was smooth-surfaced, showed no pinhole formation and had very satisfactory appearance. It was particularly noted that scarcely no offensive odor was emitted during the baking.

Control 1

The above Example 1 was repeated except that the gaseous matter composed chiefly of the gasified unreacted monomers formed in the volatilizer 5 was not passed through the partial condenser 7. That is, the adduct formed by the reaction of the monomers with the chain transfer agent was not removed as had been done in Example 1, but all the gaseous components excepting the nitrogen gas were completely condensed in the total condenser 8, and the condensed liquid was continuously recycled into the stirred-tank reactor 3 and re-used for the polymerization. The composition of the polymerization material and other operational conditions were identical with those of Example 1. The operation was continued for 120 hours after the steady state was reached, and the copolymer produced was sampled every 12 hours. The samples had progressively stronger odor and the copolymers sampled after 72 hours and at subsequent hors agglomerated into blocks during their storage in air. The melt flow index of the copolymers measured by the same method as used in Example 1 varied with time although the copolymerizing conditions were identical with those of Example 1, i.e., kept rising as the operation was prolonged, and in order for maintaining the melt flow index of the copolymer within the aforesaid control limit, the feed of the tert.-dodecyl mercaptan to the stirred-tank reactor 3 had to be reduced. As it is apparent from the foregoing, it was impossible in this Control experiment to carry out the continuous preparation of the reactive copolymer with stability.

EXAMPLE 2

A monmeric mixture composed of 20 parts of ethylbenzene, 32 parts of methyl methacrylate, 8 parts of ethyl acrylate, 16 parts of vinyltoluene, 12 parts of glycidyl methacrylate and 12 parts of β-methylglycidyl methacrylate was continuously fed into a stirred-tank reactor 3 at a rate of 12.0 liters per hour, from a nitrogen-filled tank 1. Simultaneously, n-dodecyl mercaptane to serve as a chain transfer agent was similarly continuously supplied into the same reactor 3 from a separate, $N_2$-filled tank 1' in % ratio to the monomeric mixture of 4.0 %. The stirred-tank reactor 3 was maintained at 180° C., and the monomeric mixture supplied thereinto was copolymerized with complete mixing. The copolymerized reaction liquid was continuously withdrawn from the reactor 3 at a weight rate approximately equal too that of the feed into the same reactor 3, and heated to 210° C. in the pre-heater 4. The heated reaction liquid was flashed into a jacketed volatilizer 5 evacuated to 20 mmHg (absolute pressure) and heated to 170° C., and the volatile matter in the reaction liquid was gasified.

This gaseous material, composed chiefly of the unreacted monomers was first led into a partial condenser 7 in which the adduct formed from the monomers and the chain transfer agent was completely condensed at a rate of 90 cc per hour. The condensation product was removed from the bottom of the partial condenser 7. The remaining gas which was not condensed was then sent to a total condenser 8 through which a coolant was circulated. In the total condenser 8, all the gaseous components (except the entrained nitrogen gas) was condensed, and the condensation product was continuously recycled into the reactor 3 by the pump 9, and re-used for the polymerization. The amount of the condensation liquid re-used in this occasion was 4.0 liters per hour.

On the other hand, the methyl methacrylate-ethyl acrylate-vinyltoluene-glycidyl methacrylate-β-methylglycidyl methacrylate pentanary copolymer which was separated from the gasified volatile matter in the volatilizer 5 was withdrawn from the bottom of the volatilizer 5 continuously and quantitatively as a viscous liquid, solidified as it cooled to normal temperature, and crushed to a particle size of 20 - 200 mesh.

The preparation of reactive copolymer as above was continuously performed under constant conditions for 120 hours after the copolymerization reaction reached the steady state. During the operation the copolymer formed was sampled every 12 hours. None of thus obtained reactive copolymer samples had an appreciably offensive odor, or agglomerated into blocks during storage in air. Furthermore, all the sampled reactive copolymers had no substantial difference in the copolymerized composition, the composition being substantially equivalent to that of the initially supplied monomeric mixture. That is, the composition did not undergo any substantial change throughout the above-specified period of continuous operation. Again the melt flow index of the copolymer measured by the test method specified in JIS K-6870 was always within the predetermined control limit of 60 – 70. And, approximately 70% by weight of the condensation liquid collected in the partial condenser 7 was the adduct of the chain transfer agent with the monomers, and the gaseous matter flowing into the total condenser 8 contained substantially none of the adduct.

Then, 7.5 parts of 1,10-decanedicarboxylic acid as the curing agent and 20 parts of titanium oxide as the pigment were milled with 72.5 parts of the crushed reactive copolymer, to form a powder paint composition. The composition was stored in an air bath maintained at 30° C. for 30 days, but no agglomeration occurred.

The paint composition was then used as an electrostatic coating of a steel plate pretreated with zinc phosphate and baked at 200° C. The coating formed was smooth-surfaced, had no pinholes, excellent luster, and gave off substantially no offensive odor during the baking.

What we claim is:
1. In the process for the preparation of reactive copolymers by bulk- or solution-polymerizing a material composed of a monomeric mixture consisting of at least one monomer selected from the group consisting of glycidyl acrylate, glycidyl methacrylate, β-methylglycidyl acrylate, β-methyl glycidyl methacrylate and allyl glycidyl ether and at least one monomer copolymerizable therewith selected from the group consisting of acrylic ester monomers, methacrylic ester monomers, vinyl monomers containing phenyl groups and vinyl monomers containing nitrile groups, and a chain transfer agent selected from the group consisting of aliphatic mercaptans and aromatic mercaptans, in a stirred tank reactor whereinto the reactants are continuously fed and wherefrom a reaction liquid containing said reactive copolymer is continuously withdrawn in an amount substantially equal to the material fed into said reactor, the improvement which comprises recovering said reactive copolymer from said reaction liquid by volatilizing a volatile matter contained in said reaction liquid, said volatile matter containing an adduct formed by the reaction of said chain transfer agent with said monomers; removing said adduct from said volatile matter; liquefying the removed residue; and directly recycling said liquefied residue to the reactor to be used in the polymerization.

* * * * *